United States Patent [19]

Yamadera et al.

[11] Patent Number: 5,657,837

[45] Date of Patent: Aug. 19, 1997

[54] CALIPER SUPPORT MECHANISM

[75] Inventors: Shinichi Yamadera; Hiroshi Ikegami; Yutaka Nishikawa, all of Saitama, Japan

[73] Assignee: Akebono Brake Industry Co., Ltd., Tokyo, Japan

[21] Appl. No.: 515,211

[22] Filed: Aug. 15, 1995

[30] Foreign Application Priority Data

Aug. 18, 1994 [JP] Japan .................................. 6-215216

[51] Int. Cl.⁶ .......................... F16D 65/02; F16D 55/224
[52] U.S. Cl. ...................... 188/73.45; 188/73.44; 188/73.42
[58] Field of Search .................. 188/71.1, 73.43, 188/73.44, 73.45

[56] References Cited

U.S. PATENT DOCUMENTS

| | | | |
|---|---|---|---|
| 4,334,599 | 6/1982 | Ritsema et al. | 188/73.45 |
| 4,351,421 | 9/1982 | Kurata et al. | 188/73.45 |
| 4,427,096 | 1/1984 | Stoka et al. | 188/73.45 |
| 4,685,542 | 8/1987 | Colpaert | 188/73.45 |
| 5,226,510 | 7/1993 | Le Deit | 188/73.44 |

FOREIGN PATENT DOCUMENTS

| | | | |
|---|---|---|---|
| 4411700 | 10/1994 | Germany | 188/73.45 |
| 61-21619 | 6/1986 | Japan . | |

Primary Examiner—Robert J. Oberleitner
Assistant Examiner—Chris Schwartz
Attorney, Agent, or Firm—Finnegan, Henderson, Farabow, Garrett & Dunner, L.L.P.

[57] ABSTRACT

A caliper support mechanism for supporting a disc brake caliper is slidably supported by a slide pin. The end face 21 of the stepped portion 11 of the lug 5C of the caliper 5 is arcuately incurved in cross section such that the center of a circle defined by the arcuately incurved end face 21 is coincident with the center of the bolt hole 10 of the lug 5C, and the arcuately incurved end face 21 is directed obliquely and outwardly with respect to the horizontal line H in the lug 5C of the caliper 5. The structure reduces the squeeze of the slide pins by the support bracket as well as the drag and squeak of the brake.

11 Claims, 4 Drawing Sheets

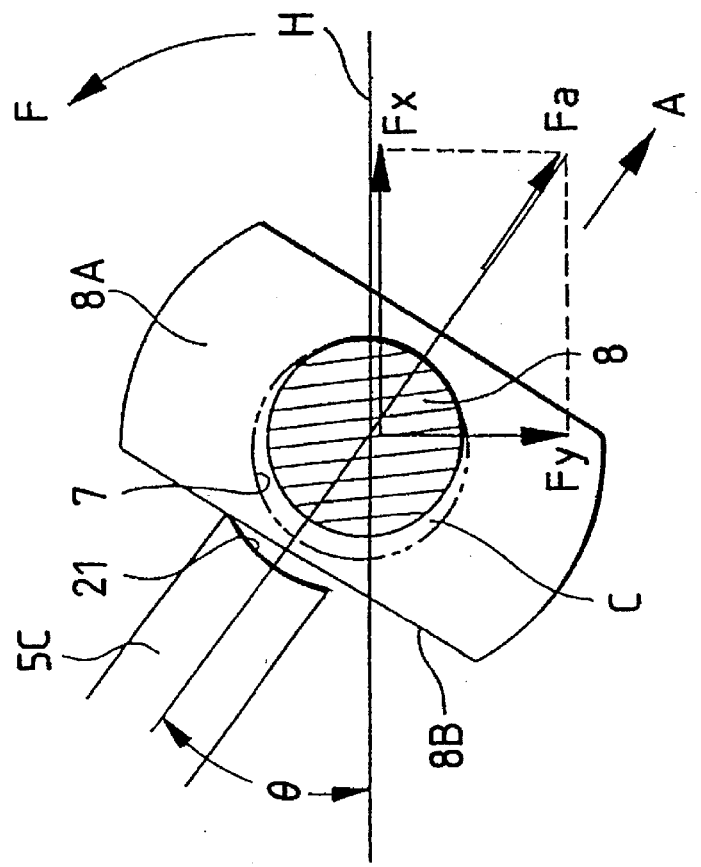
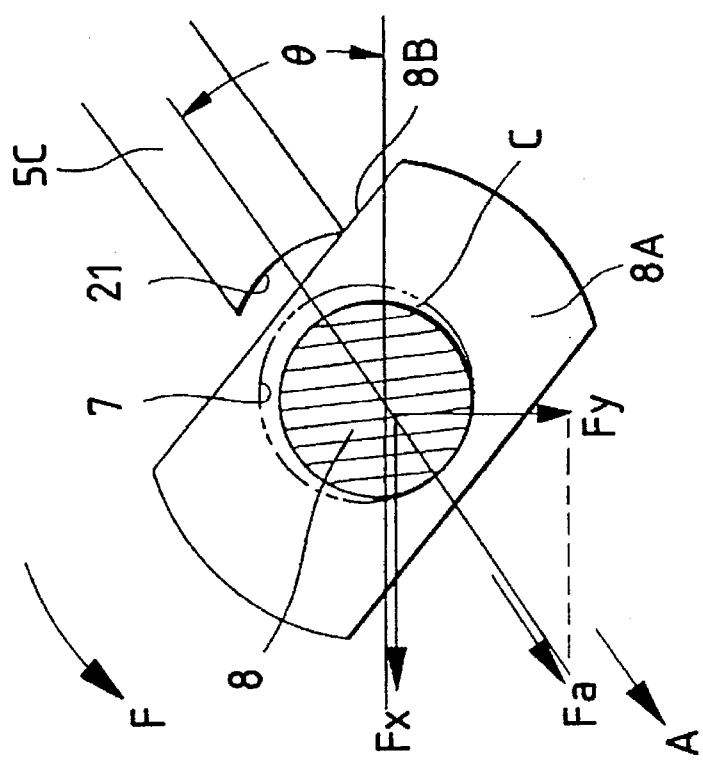
FIG. 1(A)
FIG. 1(B)

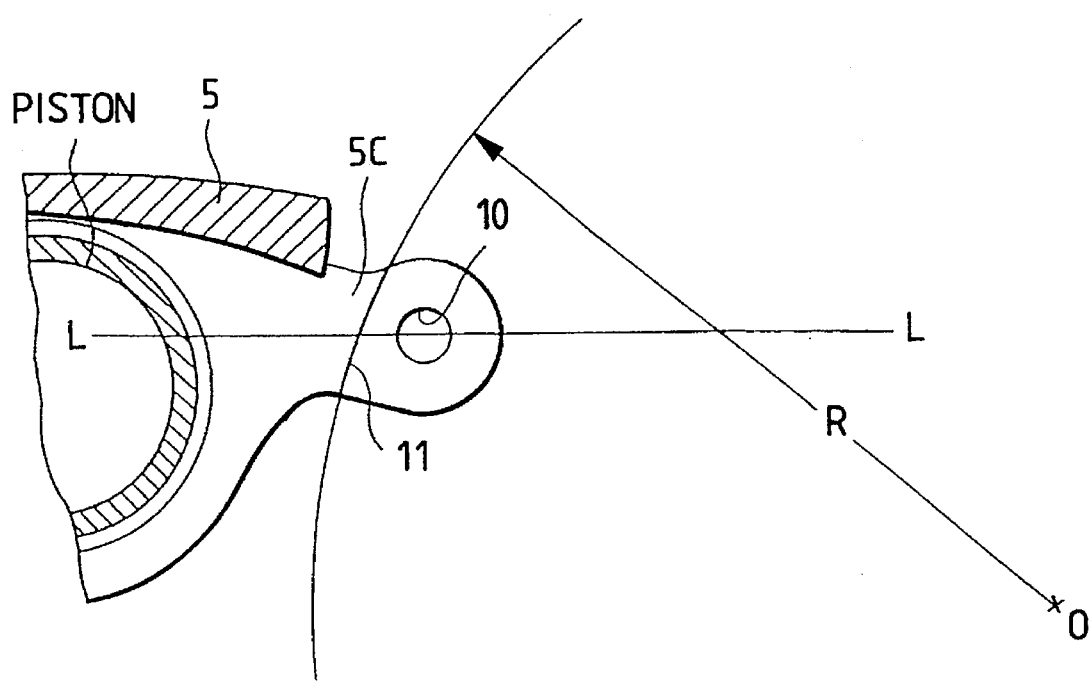

CALIPER SUPPORT MECHANISM

BACKGROUND OF THE INVENTION

1. Field of the Invention

The present invention relates generally to a caliper of a disc brake device mainly used for an automobile, and particularly to a support mechanism for slidably supporting the caliper by means of a slide pin. More particularly, the invention relates to a mechanism for a rotation-preventing structure of a divided pin in a caliper support mechanism of the disc brake of the type in which a slide pin is fastened to the caliper by means of a bolt, whereby the squeezing of the slide pin by the support bracket is remarkably reduced, the slide pin is smoothly slidable within the pin guide hole of the support bracket, and the drag of the brake and the squeak of the brake are remarkably reduced.

2. Related Art

A disc brake of the type in which the caliper is slidably supported by the slide pin, and the slide pin is fixed to a lug of the caliper by means of a bolt is known. Such a structure that a stepped portion is formed in the lug of the caliper in order to stop the turn of the slide pin which otherwise would be turned together with the bolt when the bolt is screwed into the threaded hole of the end face of the slide pin and tightened thereto, and the flat side of a head of the slide pin is brought into contact with the end face of the stepped portion, thereby stopping the turn of the slide pin, is also known as disclosed in Post-examined Japanese Utility Model Publication No. Sho. 61-21619.

The conventional art will briefly be described with reference to FIGS. 4 to 6.

A bolt 9 is inserted into a bolt hole 10 of a lug 5C of a caliper 5. A flat side 8B of a head 8A of a slide pin 8 is brought into contact with the end face of a stepped portion 11 of the lug, to thereby stop the turn of the slide pin. The bolt 9 is screwed into a screw hole 8C of the end face of the slide pin 8 and tightened thereto, so that the slide pin 8 is fixed to the lug 5C. The slide pin 8 is slidably inserted into a pin guide hole 7 of a support bracket 1, whereby the support bracket 1 slidably supports the caliper 5.

The stepped portion 11 is formed in the lug 5C of the caliper 5. The head 8A is bevelled to have flat sides 8B. The flat side 8B is brought into contact with the end face of the stepped portion 11, to thereby prevent the turn of the slide pin 8. The end face of the stepped portion is arcuately incurred in cross section.

In the disc brake of the type in which the caliper is slidably supported by the slide pin, the pin type disc brake, under a braking force, the brake pad pushes the support brackets outwardly when viewed horizontally. The support bracket is slightly bent aside in the braking direction, by the pushing force of the brake pad. As the deflection of the support bracket, the pin guide hole of the support bracket is displaced with respect to the slide pin. By the displacement of the pin guide hole, the sliding resistance of the slide pin increases, thereby hindering a smooth motion of the slide pin within the pin guide hole. The wear of the slide pin is promoted, so that the durability thereof is reduced and a resistance to the returning motion of the caliper increases. Drag of the brake and the squeak of the brake take place. An additional problem of the conventional art is that much and care work is required for arcuately curving inward the end face of the stepped portion of the lug of the caliper.

SUMMARY OF THE INVENTION

The present invention was made in view of the foregoing difficulties accompanying the conventional caliper support mechanism. Accordingly, an object of the present invention is to provide a caliper support mechanism of a disc brake capably of reducing the squeezing of the slide pin by the support bracket as small as possible by making use of the interaction of the end face of the stepped portion of the lug of the caliper and the flat side of the head of the slide pin, to thereby provide the smoothest possible motion of the slide pin within the pin guide hole of the slide pin, and makes easy the work for shaping the end face of the stepped portion of the lug of the caliper.

The above and other objects can be achieved by a provision of a caliper supporting mechanism in which, according to the present invention, an end face of the stepped portion of the lug of the caliper is arcuately incurred in cross section such that the center of a circle defined by the arcuately incurred end face is coincident with the center of the bolt hole of the lug, and the arcuately incurred end face is directed obliquely and outwardly with respect to the horizontal line in the lug of the caliper.

BRIEF DESCRIPTION OF THE DRAWINGS

FIG. 1 is a view for explaining the operation of the present invention by a model;

FIG. 6 is an enlarged view showing a lug of the caliper of the conventional art of FIG. 4.

DESCRIPTION OF THE PREFERRED EMBODIMENT

Figure 2:
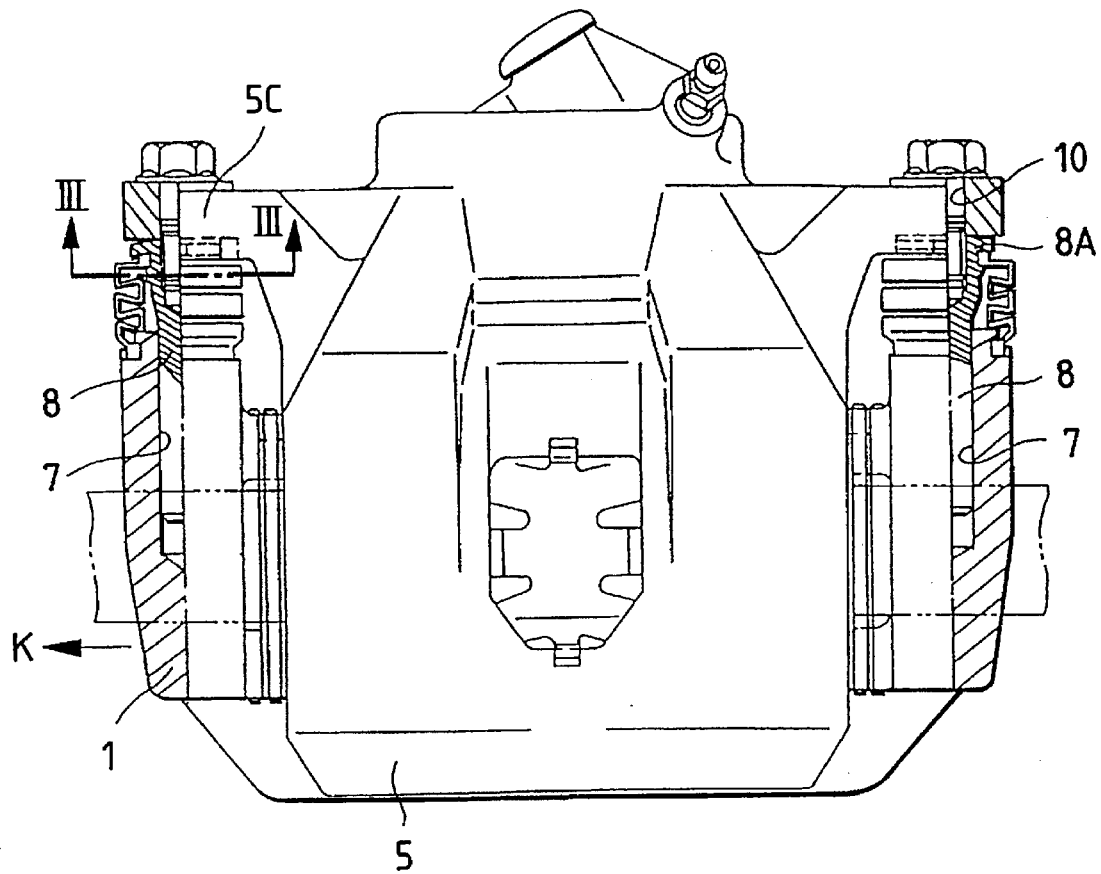
FIG. 2 is a diagram showing an overall caliper with a slide pin firmly attached thereto.

The preferred embodiment of the present invention and the operation of which will now be described with reference to FIGS. 1 to 3.

FIG. 1 schematically illustrates the relationship among the end face 21 of the stepped portion of the lug, the head 8A of the slide pin, the slide pin 8, and the pin guide hole 7. FIG. 2 is a view showing the overall caliper with the slide pin 8 firmly attached thereto, and FIG. 3 is a cross sectional view taken on line III—III in FIG. 2.

Figure 3:
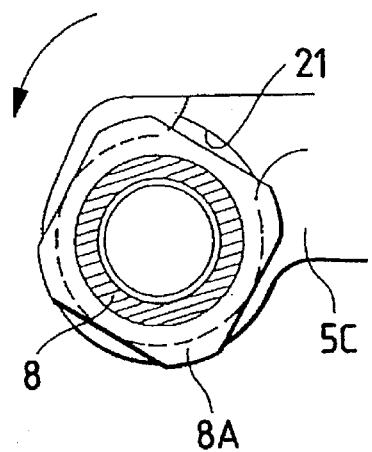
FIG. 3 is a cross sectional view taken on line III—III in FIG. 2 (boot and the like are omitted)
Figure 4:
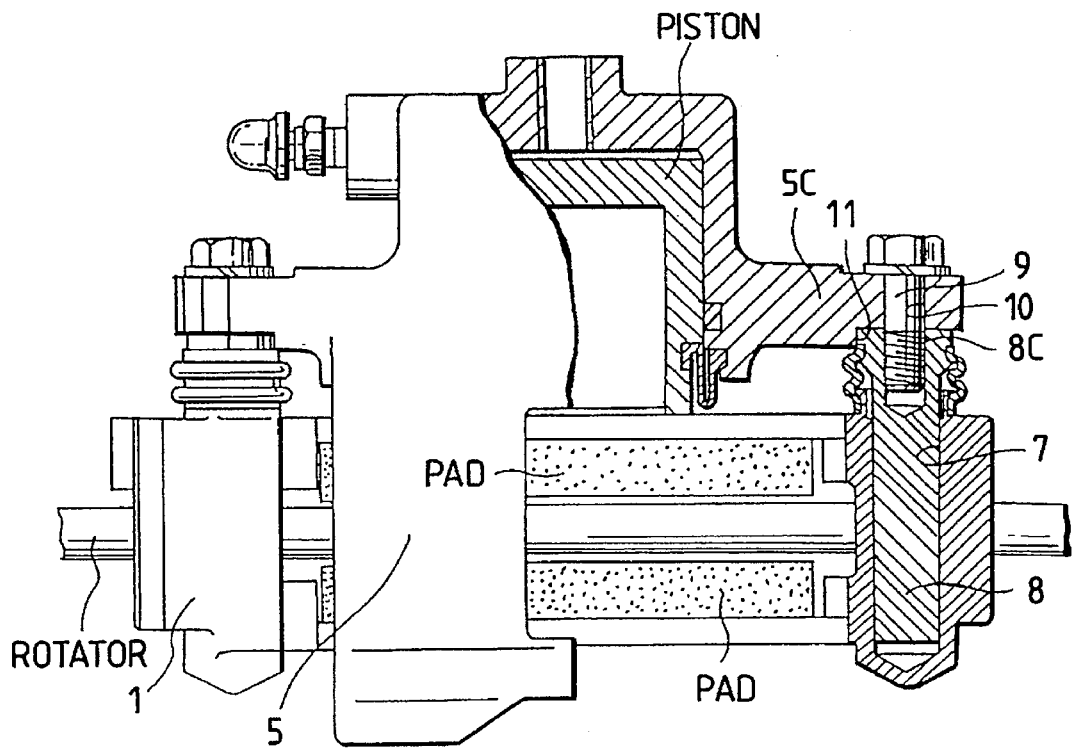
FIG. 4 is a view partially in cross section showing a conventional art.
Figure 5A:
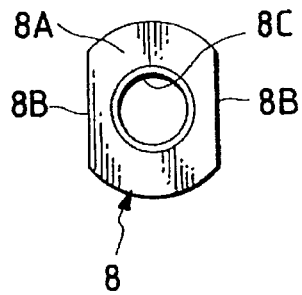
FIG. 5A is a front view of a prior art slide pin.
Figure 5B:
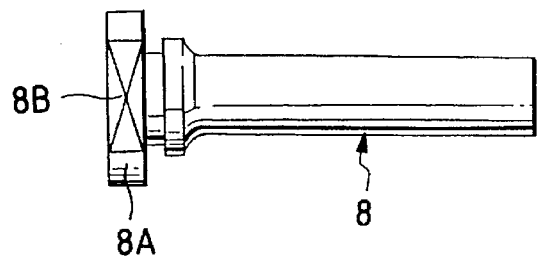
FIG. 5B is a side view of the prior art slide pin.

In FIGS. 1 and 3, the end face 21 of the lug, which is arcuately incurred, is coaxial with the slide pin 8 (the center of the slide pin is coincident with the center of the bolt hole). In other words, the center of a circle defined by the arcuately incurred end face is coincident with the center of the bolt hole of the lug. The arcuately incurred end face 21 is directed obliquely and outwardly (in the direction of an arrow A in FIG. 1) with respect to the horizontal line in the lug of the caliper. As shown in FIG. 1, a center axis of the end face 21 of the lug 5c is slanted at an angle θ (30° in this embodiment) from the horizontal line H. The bolt is screwed into the threaded bolt hole 10 of the end face of the slide pin 8, and tightened thereto.

A torque of the direction of an arrow F acts on the slide pin 8 and the head 8A as well. The flat side 8B is forcibly pressed against the end face 21 of the stepped portion, whereby the turn of the slide pin is prevented. The slide pin 8 receives a reaction force from the end face 21. That is, a force Fa of the direction of an arrow A acts on the slide pin 8, so that the component Fx of the force Fa presses the slide pin 8 against the inner surface of the pin guide hole 7. As a result, a gap C is formed between the inner surface of the pin guide hole 7 and the outer surface of the slide pin 8 that is opposite to the outer surface thereof where it is pressed against the inner surface by the component force Fx. In this state, the slide pin 8 is fixed to the lug of the caliper. At this time, the component Fy of the force Fa is, zeroed as the result of a free motion of the caliper. Accordingly, the slide pins 8 and 8 are mounted on the caliper 5 in a state that the slide pins 8 and 8 are respectively pressed against the inner surfaces of the pin guide holes 7 by proper forces since the component forces Fx, of which the directions are opposite to each other, act on the slide pins 8 and 8. As a result, a good slide movement of the slide pin 8 within the pin guide hole 7 is ensured.

It is supposed that in this state, a braking force acts on the caliper. Then, the brake pad pushes the left support bracket 1 (FIG. 2) to the left (direction of an arrow K), so that it is displaced to the left. With the displacement of the left support bracket 1, the pin guide hole 7 thereof is displaced to the left. However, the displacement of the pin guide hole 7 is absorbed by the large gap C. At this time, if the left slide pin 8 hits the inner wall (right side) of the pin guide hole 7, it is not thrust forcibly by the latter. The left slide pin 8 hits the inner surface (right side) of the pin guide hole 7, and is pushed to the left. Then, the whole caliper 5 (FIG. 2) is pushed to the left.

The right slide pin 8 is pulled to the left. At this time, the right slide pin 8 is allowed to displace to the left with respect to the pin guide hole since the right slide pin 8 is fixed to the lug of the caliper at a location closer to the right side with respect to the pin guide hole 7 of the right support bracket 1, and the large gap C is present on the left side of it. For this reason, the sliding resistance of the right slide pin does not increase.

In the above-mentioned operation of the disc brake, the brake pad is pushed to the left by the rotation of the rotor, and the left support bracket is pushed to the left. The same thing is true for a case where when the vehicle wheels are turned in the opposite direction, the brake operates and the brake pad pushes the right support bracket to the right.

Thus, the caliper support mechanism can reduce the sliding resistance of the slide pin as small as possible.

So long as the angle θ for the end face of the stepped portion (angle with respect to the horizontal line containing the center of the bolt hole) is within the range from 0° to 90°, the caliper support mechanism must operate as mentioned above when theoretically considered. When the angle θ=0°, the weight of the caliper acts on the slide pin to push it downward. Therefore, the position of the slide pin 8 when the angle θ=0° is almost equal to that of the slide pin 8 when the angle θ=10°. When the angle θ=90°, it is almost equal to that in a case where the slide pin 8 is fixed in a state that it is in contact with the bottom of the pin guide hole. In this state, the actual effects are not remarkable. For this reason, it is preferable to set the angle θ within the range from 10° to 80°.

It is believed that the object, construction and the effects of the present invention will be understood from the foregoing description since it is not directed to the specific mechanism and structure. A specific example of the present invention will briefly be described for reference.

A pin type disc brake used was specified: the rotor diameter=280 mm, the maximum braking torque=150 kg-m, and caliper weight=5 kg, diameter of the slide pin=9.7 mm, inner diameter of the pin guide hole=10 mm, bolt diameter=8 mm, diameter of the bolt hole=8.5 mm, curvature radius of the end face (of the stepped portion of the lug)=28 mm, length of the end face=6 mm, angle θ=40°, and gap C=0.57 mm. A quantity of a displacement of the tip of the support bracket when the maximum braking torque is 150 kg-m was 0.3 mm in this embodiment, although it depends on the rigidity of the support bracket. This value is within 0.57 mm of the gap C. The sliding resistance of the slide pin does not increase. When angle θ=10°, the gap C was 0.60 mm, and when angle θ=80°, the gap C was 0.35 mm. For the vehicle of comparison, when angle θ=0°, the gap C was 0.6 mm, and when angle θ=90°, the gap C was 0.15 mm.

A specific maximum quantity of the displacement of the support bracket when a braking force is applied depends largely on a state of the application, quick or slow, of the braking force and the rigidity of the support bracket. Therefore, the maximum quantity of the displacement is not instructive in particular in evaluating the present invention.

However, the comparison of the sliding resistance of the caliper of the present invention under the maximum braking force with that of the conventional caliper in which the end face of the stepped portion is directed inward will show outstanding effects of the invention. In this case, the measurement of the sliding resistance of both the calipers are carried out in a state that other conditions than the above are set to be equal to each other.

The unique structure that the end face 21 is coaxial with the bolt hole 10 allows these members to be worked in one step.

Further, when the braking torque acts on the support bracket, the slide pin is not thrust forcibly by the support bracket, thereby allowing the slide pin to smoothly be slid within the pin guide hole. Accordingly, the drag of the brake and the squeak of the brake are reduced as small as possible.

The problems of the conventional art are solved by unique shape of the end face of the stepped portion of the lug of the caliper, and the unique positional relationship between the end face and the flat side of the head of the slide pin.

The solving means do not require any alteration or addition of mechanical components and the method of working them.

Accordingly, neither increase of weight nor increase of the manufacturing cost is incident to the solving means. This is one of the great advantages of the present invention.

What is claimed is:

1. A caliper support mechanism for a disc brake, comprising:

a caliper including a pair of lugs, each lug having a bolt hole and a stepped portion, an end face of each said lug being arcuately incurved;

a support bracket having a pair of pin guide holes;

a pair of bolts insertable into said bolt holes of said lugs of said caliper; and a pair of slide pins, each said pin comprising a threaded hole and a head having a flat side, said flat side of each said slide pin being in contact with an end face of said stepped portion of each said lug, said bolts being screwed into said threaded holes of said slide pins and tightened thereto, and said slide pins being slidably inserted into said pin guide holes of said support bracket, and further wherein a center of a circle defined by said arcuately incurved end face of each said lug is coincident with a center of its respective bolt hole.

2. The caliper support mechanism of claim 1, wherein the arcuately incurved end face of each said lug is directed obliquely and outwardly with respect to a reference line extending between center points of the slide pins.

3. The caliper support mechanism of claim 2, wherein the end face of each said lug is slanted at an angle within a range of 0° to 90° with respect to the reference line.

4. The caliper support mechanism of claim 3, wherein the end face of each said lug is slanted at an angle within a range of 10° to 80° with respect to the reference line.

5. The caliper support mechanism of claim 4, wherein the end face of each said lug is slanted at an angle of 30° with respect to the reference line.

6. A caliper support mechanism for a disc brake, comprising:

a caliper including a pair of lugs, each lug having a bolt hole and a stepped portion, an end face of each said stepped portion being arcuately incurved;

a support bracket having a pair of pin guide holes;

a pair of bolts insertable into said bolt holes of said lugs of said caliper; and a pair of slide pins, each said pin comprising a threaded hole and a head having a flat side, said flat side of each said slide pin being in contact with the end face of each said stepped portion of each said lug, each said bolt being screwed into each said threaded hole of each said slide pin and tightened thereto, each said slide pin being slidably inserted into each said pin guide hole of said support bracket, wherein a torque of a certain direction acts on each said slide pin and said head forcibly pressing said flat side of each said slide pin against each said end face of said stepped portion, and further wherein each said slide pin receives a reaction force from each said end face, and further wherein a force of said certain direction acts on each said slide pin and generates a first component of said force which presses each said slide pin against an inner surface of said each pin guide hole resulting in a gap being formed between the inner surface of each said pin guide hole and an outer surface of each said slide pin each said gap being opposite the portion of outer surface of each said slide pin which is pressed against the inner surface of each said pin guide hole by the first component force and further wherein said force of said certain direction acts on each said slide pin and generates a second component which is zeroed as a result of a free motion of the caliper, so that the slide pins are mounted on the caliper such that said slide pins are respectively pressed against the inner surfaces of said pin guide holes by the first component forces which act in opposite directions to each other.

7. The caliper support mechanism of claim 6, wherein a center of a circle defined by said arcuately incurved end face of said lug is coincident with a center of said slide pin.

8. The caliper support mechanism of claim 7, wherein the arcuately incurved end face of each said lug is directed obliquely and outwardly with respect to a reference line extending between center points of the slide pins.

9. The caliper support mechanism of claim 8, wherein the end face of each said lug is slanted at an angle within a range of 0° to 90° with respect to the reference line.

10. The caliper support mechanism of claim 9, wherein the end face of each said lug is slanted at an angle within a range of 10° to 80° with respect to the reference line.

11. The caliper support mechanism of claim 10, wherein the end face of each said lug is slanted at an angle of 30° with respect to the reference line.

* * * * *